(12) United States Patent
Liang et al.

(10) Patent No.: US 8,244,012 B2
(45) Date of Patent: Aug. 14, 2012

(54) COMPUTER AIDED DETECTION OF PULMONARY EMBOLISM WITH LOCAL CHARACTERISTIC FEATURES IN CT ANGIOGRAPHY

(75) Inventors: Jianming Liang, Chester Springs, PA (US); Jinbo Bi, Chester Springs, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 785 days.

(21) Appl. No.: 12/398,450

(22) Filed: Mar. 5, 2009

(65) Prior Publication Data
US 2009/0252394 A1    Oct. 8, 2009

Related U.S. Application Data

(63) Continuation-in-part of application No. 12/022,548, filed on Jan. 30, 2008, now Pat. No. 8,036,440.

(60) Provisional application No. 60/888,165, filed on Feb. 5, 2007, provisional application No. 61/035,515, filed on Mar. 11, 2008.

(51) Int. Cl.
*G06K 9/00* (2006.01)
(52) U.S. Cl. ......................................................... 382/128
(58) Field of Classification Search .......... 382/128–134; 128/920–925; 356/39–49; 600/407–414, 600/424–426; 345/581–518
See application file for complete search history.

(56) References Cited

U.S. PATENT DOCUMENTS

2008/0050003 A1* 2/2008 Periaswamy et al. ......... 382/134
2008/0080770 A1* 4/2008 Mendonca et al. ........... 382/180
* cited by examiner

*Primary Examiner* — Atiba O Fitzpatrick
(74) *Attorney, Agent, or Firm* — Peter Withstandley

(57) ABSTRACT

A method for computer aided detection of pulmonary emboli includes acquiring medical image data. A pulmonary embolism candidate comprising a cluster of voxels is identified. It is determined whether the candidate is a true pulmonary embolism or a false positive based on a spatial distribution of intensity values for the voxels of the cluster of voxels. The pulmonary embolism candidate is presented to a user when the candidate is determined to be a true pulmonary embolism.

19 Claims, 16 Drawing Sheets

(a)

(b)

(c)

(d)

(e)

(f)

| | 1 | 2 | 3 | 4 | 5 | 6 | 7 | 8 | 9 |
|---|---|---|---|---|---|---|---|---|---|
| 1 | -124 | -124 | -124 | -124 | -124 | -124 | -94 | -74 | -84 |
| 2 | -124 | -124 | -124 | -74 | -74 | -74 | -34 | 46 | 76 |
| 3 | -74 | 26 | 76 | 76 | 76 | 76 | 126 | 176 | 176 |
| 4 | 96 | 176 | 186 | 226 | 226 | 226 | 226 | 226 | 226 |
| 5 | 226 | 226 | 226 | 26 | 26 | 76 | 226 | 226 | 176 |
| 6 | 226 | 226 | -4 | -4 | -24 | 96 | 176 | 76 | 26 |
| 7 | 226 | 176 | 176 | 76 | 26 | -24 | 26 | -74 | -74 |
| 8 | 76 | 76 | -24 | -124 | -124 | -124 | -124 | -124 | -124 |
| 9 | -124 | -124 | -124 | -124 | -124 | -124 | -124 | -124 | -124 |

Algorithm 1: Basic Tobogganing

Input:
    p = P(v)    {toboggan potential p of voxel v; the original CT value for PE detection}
    lt    {the low threshold, set to -50 HU for PE detection}
    ht    {the high threshold, set to 100 HU for PE detection}

Output:
    l = L(v)    {toboggan cluster label l for voxel v, see note 1 for details}
    u = D(v)    {sliding direction; v slides to u}

Data Structure:
    S    {stack of slide voxels}

Functions:
    E = N(v)    {get neighbors E of voxel v}
    g = tob(v)    {g = arg min$_{t \in N(v) \cup \{v\}}$ P(t) }
    r = newLabel()    {a new label r; for PE detection, a single unique label $\varepsilon$ sufficient}

Steps:
    for each voxel v do begin
        if (L(v) = nil) then begin {process each unlabeled voxel v}
            {Step A: Initialization}
                u ← v;  S ← ∅;
            {Step B: Sliding to a labeled voxel or a concentration}
                repeat
                      u' = tob(u);
                      if (u' ≠ u) then begin
                          S ← u; D(u) ← u'; u ← u';
                      end else {found concentration - a voxel cannot slide to any of its neighbors}
                          break;
                until (L(u) ≠ nil)
            {Step C: Assigning a new label to u if it is unlabeled}
            if (L(u) = nil) begin
                L(u) ← newLabel(); {L(u) ← $\varepsilon$ for PE detection}
            end
            {Step D: Labeling all voxels in S with u's label}
            for each r ∈ S do begin
                L(r) ← L(u);
            end
        end
    end

FIG. 6

Algorithm 2: Concentration oriented Tobogganing

Input:
    s                  {initial site}
    p = P(v)        {toboggan potential p of voxel v; the original CT value for PE detection}
    lt               {the low threshold}
    ht              {the high threshold}

Output:
    C               {toboggan cluster containing initial site s; initially empty}
    B               {external boundary pixels of cluster C; initially empty}

Data Structures:
    A               {Active list of voxels; initially empty}

Functions:
    E = N(v)        {get neighbors E of voxel v}
    g = tob(v)       {g = arg min$_{t \in N(v) \cup \{v\}}$ P(t) }
    A = update(A,v)   {$\forall$ r $\in$ N(v), A $\leftarrow$ r, if (r $\notin$ A) and (r $\notin$ C) and (P(r) $\in$ [lt, ht]) }
    q = pop(A)      {q = arg min$_{a \in A}$ P(a) }

Steps:
    {Step A: Find concentration c of initial site s}
        c = s;
        repeat
            q = c; c = tob(q);
        until (q == c)
    {Step B: Expand from concentration c with CT value in the PE HU range}
        if (P(c) $\in$ [lt, ht]) begin
            {Step B.1: Base Step}
                C $\leftarrow$ c; A = update(A, c);
            {Step B.2: Iterative Step}
                repeat
                    q = pop(A); r = tob(q);
                    if r $\in$ C begin {include q into cluster C and update A}
                        C $\leftarrow$ q; A = update(A,q);
                    end else begin {include q into external boundary B}
                        B $\leftarrow$ q;
                    end
                until A is empty
        end

FIG. 7

Algorithm 3: Detecting PE

Input:
    p = P(v)         {toboggan potential p of voxel v; the original CT value for PE detection}
    lt                 {the low threshold, set to -50 HU for PE detection}
    ht                {the high threshold, set to 100 HU for PE detection}

Output:
    M               {detected PE candidates; initially empty}
    F                {CAD findings; initially empty}

Data Structures:
    B               {external boundary pixel list}
    C               {A PE candidate - connected component - with multiple clusters}

Functions:
    {C, B} = COT(s,p,lt,ht)   {concentration oriented toboggan algorithm applied at initial site s}
    V = FC(C)           {Features are extracted on candidate C forming a feature vector}
    L = CLS(C, V)      {A candidate C with feature vector V classified as L: "PE" or "non-PE"}

Steps:
```
for each voxel v do begin
    {C, B} = COT(v,p,lt,ht);
    if C is not empty then begin
        while B is not empty do begin
            b ← B {A boundary pixel b selected and removed from B}
            {C', B'} = COT(b,p,lt,ht);
            if C' is not empty do begin
                B = B ∪ B'; {added with the newly found boundary pixels B'}
                C = C ∪ C'; {merged with the newly extracted cluster}
            end
        end
        M ← C; {A PE candidate C formed and added to M}
        V = FC(C) {Compute features for candidate C}
        L = CLS(C, V) {Classify candidate C}
        if L is "PE" then begin {Candidate C is classified as PE}
            F ← C; {A PE finding formed and added to F}
        end
    end
end
```

FIG. 8

COMPUTER AIDED DETECTION OF PULMONARY EMBOLISM WITH LOCAL CHARACTERISTIC FEATURES IN CT ANGIOGRAPHY

CROSS-REFERENCE TO RELATED APPLICATION

The present application is a continuation-in-part of U.S. patent application Ser. No. 12/022,548, filed Jan. 30, 2008 now U.S. Pat. No. 8,036,440, which claims priority from U.S. Provisional Application No. 60/888,165, filed Feb. 5, 2007, the entire content of which are herein incorporated by reference; the present application also claims priority from U.S. Provisional Application No. 61/035,515, filed Mar. 11, 2008, the entire contents of which are herein incorporated by reference.

BACKGROUND OF THE INVENTION

1. Technical Field

The present disclosure relates to CT angiography ad, more specifically, to computer aided detection of pulmonary embolism with local characteristic features in CT angiography.

2. Discussion of Related Art

A pulmonary embolism (PE) is a blockage such as clot that has traveled through the blood stream to artery of the lung. If untreated, a PE can lead to death in a high proportion of patients. Once detected, PEs may be successfully treated with anticoagulants. Accordingly, the ability to quickly and accurately detect PEs is literally a matter of life and death.

However, proper detection of PEs is particularly challenging and is often prone to errors such as failing to be properly diagnosed. Often, computed tomography (CT) is used to visualize the pulmonary arteries so that a highly trained medical practitioner such as a radiologist can examine the imagery for indications of a PE.

Clinically, manual reading of CT imager is laborious, time consuming and complicated by various PE look-alikes (false positives) including respirator motion artifacts, flow-related artifacts, streak artifacts, partial volume artifacts, stair step artifacts, lymph nodes, and vascular bifurcation, among many others. The accuracy and efficiency of interpreting such a large image data set is also limited by human factors, such as attention span and eye fatigue. Consequently, it is highly desirable to have a computer aided detection (CAD) system to assist radiologists in detecting and characterizing emboli in an accurate, efficient and reproducible way. Such a CAD should achieve a high detection sensitivity with few false positives to acquire clinical acceptance. Moreover, automatic detection systems must be able to rapidly process the CT imagery and detect PE candidates in a timely manner as a patient suffering from a PE must often receive treatment immediately after the first signs of symptoms if treatment is to be successful.

Existing approaches for computer aided diagnosis of PE generally involve vessel segmentation, where prior to the detection of PE candidates, the pulmonary vessel structure is first fully identified from within the CT image data. The search for PE candidates may then be performed within the segmented vessel tree. However, vessel segmentation is computationally expensive and particularly time consuming. Moreover, limiting the search field to the segmented vessel tree may introduce the possibility that errors in segmentation may result in the failure to identify one or more PE candidates. For example, such approaches to computer aided diagnosis of PE candidates may be especially ill-suited for small vasculature where subsegmental PEs often occurs.

Furthermore, where radiocontrast agents are administered, regions of pulmonary vessels where blood is flowing properly are enhanced by the contrast material whereas areas of obstruction may not be fully enhanced. Accordingly, there might not be a need to search for PEs in the enhanced regions of the pulmonary vessel tree. Therefore, even where the entire pulmonary vascular structure is correctly segmented, much of the segmented tree will not be considered for the occurrence of PE candidates.

Existing techniques for image processing include watershed, hierarchical tobogganing, intelligent paint, and intelligent scissor (i.e., "live-wire"). These techniques may represent available imaging processing methods, but have not necessarily been used in the art as part of an approach for PE identification. Watershed techniques include rainfalling simulation and hill climbing. The watershed technique based on hill climbing requires that all the minima be found in advance and marked with distinct labels followed by "hill climbing". This implies that one would not be able to obtain a watershed region till the whole image has been scanned and processed. "Hierarchical tobogganing" includes repeatedly applying a basic toboggan approach, forming a toboggan hierarchy. "Intelligent paint" is built on top of hierarchical tobogganing to allow the user to interactively "select" the pre-formed toboggan regions at a user pre-specified toboggan hierarchical level, based on cost-ordered region collection.

"Intelligent scissor" or interactive "live-wire" aims to compute an optimal path from a selected seed point to every other points in the image based on unrestricted graph search, so that the user can move the mouse freely in the image plane and interactively "select" a desired path among all the optimal paths based on the current cursor position.

The underlying algorithm in intelligent scissor or interactive live-wire is the Dijkstra's algorithm, which computes a shortest path from a given point to all other points in the image. However, for large images, the underlying graph created in live-wire for search becomes large; the interativeness of livewire may be ineffective due to fundamental limitations of Dijkstra's algorithm. An alternative is toboggan-based live-wire, in which the basic toboggan algorithm is applied to reduce the underlying graph in live-wire to achieve highly efficient interaction in image segmentation.

Moreover, these existing image processing techniques may not be suitable for PE detection as they may fail to extract a toboggan cluster from an initial site without processing pixels beyond its external boundary.

Existing approaches for detection of PE in CT imagery are either computationally inefficient, slow and/or fail to have a sufficient level of accuracy.

SUMMARY

A method for computer aided detection of pulmonary emboli includes acquiring medical image data. A pulmonary embolism candidate comprising a cluster of voxels is identified. It is determined whether the candidate is a true pulmonary embolism or a false positive based on a spatial distribution of intensity values for the voxels of the cluster of voxels. The pulmonary embolism candidate is presented to a user when the candidate is determined to be a true pulmonary embolism.

Determining whether the candidate is a true pulmonary embolism or a false positive based on the spatial distribution of intensity values for each voxel of the cluster of voxels may include representing the cluster of voxels as a gray level co-occurrence matrix, calculating one or more features from the co-occurrence matrix, and determining whether the candidate is a true pulmonary embolism based on the calculated values of the one or more features. The one or more features may include one or more of entropy, energy, contrast and homogeneity.

The candidate may be determined to be a true pulmonary embolism candidate when the entropy is low, the energy is high, the contrast is low and the homogeneity is large. Trained classifiers may be used to determine when entropy is low, energy is high, contrast is low and homogeneity is large.

Determining whether the candidate is a true pulmonary embolism or a false positive may be based on whether the candidate is surrounded by a vessel-like surface, in addition to the spatial distribution of intensity values for the voxels of the cluster of voxels. Determining whether the candidate is surrounded by a vessel-like surface may include performing a multi-scale Hessian vessel likelihood test.

It may be determined that the candidate is surrounded by a vessel-like surface when a Hessian matrix H formed from second derivatives of intensity within a neighborhood of the voxels proximate to the candidate have two negative eigenvalues and a third eigenvalue that is close to zero and eigenvectors corresponding to the first two eigenvalues lie in a plane that is orthogonal to a central axis and an eigenvector corresponding to the third eigenvalue is in line with the central axis.

Determining whether the candidate is a true pulmonary embolism or a false positive may be based on whether the candidate is located within an artery, in addition to the spatial distribution of intensity values for the voxels of the cluster of voxels. Determining whether the candidate is located within an artery may include segmenting a segment of a surrounding vessel, calculating a gray level co-occurrence matrix for the vessel segment, calculating texture features for the vessel segment based on the gray level co-occurrence matrix, and determining whether the calculated texture features are indicative of an artery.

A method for computer aided detection of pulmonary emboli includes acquiring a CT scan of a patient subject. One or more pulmonary embolism candidates are identified from within the CT scan using a concentration-oriented tobogganing approach. Each of the pulmonary embolism candidates is represented as a gray level co-occurrence matrix. One or more features are calculated from each co-occurrence matrix, the one or more features including entropy, energy, contrast and homogeneity. It is determined whether each of the identified pulmonary embolism candidates is a true pulmonary embolism or a false positive based on the calculated features from each co-occurrence matrix.

A candidate of the one or more pulmonary embolism candidates may be determined to be a true pulmonary embolism candidate when the entropy is low, the energy is high, the contrast is low and the homogeneity is large. Trained classifiers may be used to determine when entropy is low, energy is high, contrast is low and homogeneity is large.

Determining whether each of the identified pulmonary embolism candidates is a true pulmonary embolism or a false positive may additionally include determining whether the candidate is surrounded by a vessel-like surface.

Determining whether each of the identified pulmonary embolism candidates is a true pulmonary embolism or a false positive may additionally includes determining whether the candidate is located within an artery.

Determining whether each of the identified pulmonary embolism candidates is located within an artery may include segmenting a segment of a surrounding vessel, calculating a gray level co-occurrence matrix for the vessel segment, calculating texture features for the vessel segment based on the gray level co-occurrence matrix, and determining whether the calculated texture features are indicative of an artery.

A computer system includes a processor and a program storage device readable by the computer system, embodying a program of instructions executable by the processor to perform method steps for detection of pulmonary emboli. The method includes acquiring medical image data, identifying a pulmonary embolism candidate within the medical image data, representing the identified pulmonary embolism candidate as a gray level co-occurrence matrix, calculating one or more features from the co-occurrence matrix, the one or more features including one or more of entropy, energy, contrast and homogeneity, and determining whether the identified pulmonary embolism candidates is a true pulmonary embolism or a false positive based on the calculated features.

The candidate may be determined to be a true pulmonary embolism candidate when the entropy is low, the energy is high, the contrast is low and the homogeneity is large. Trained classifiers may be used to determine when entropy is low, energy is high, contrast is low and homogeneity is large.

Determining whether the identified pulmonary embolism candidates is a true pulmonary embolism or a false positive may additionally include determining whether the candidate is located within an artery.

Exemplary embodiments of the invention as described herein generally include methods and systems for a toboggan-based approach to automated computer aided detection of pulmonary embolism in CT angiography. A method according to an embodiment of the invention uses a set of distinguished features that requires no vessel segmentation, reports any detection incrementally in real time, and detects both acute and chronic pulmonary emboli, achieving 80% sensitivity with 4 false positives. A method according to an embodiment of the invention is also highly interactive, capable of reporting any PE detection in real time for radiologist to review and approval, while it continues searching for any additional PEs, thus meeting ER requirements.

According to an aspect of the invention, there is provided a method for detecting pulmonary embolisms in computed tomographic (CT) angiography, including providing a digitized (CT) image acquired from inside a pulmonary vessel, the image comprising a plurality of intensities corresponding to a 3-dimensional grid of voxels, for each voxel in the image, extracting a first pulmonary embolism (PE) candidate and PE boundary from the voxel, and for each voxel in the PE boundary, selecting a voxel from the PE boundary, extracting a subsequent PE candidate and PE boundary from the voxel, merging the subsequent PE candidate with the first PE candidate, and merging the subsequent PE boundary with the first PE boundary.

According to a further aspect of the invention, extracting a pulmonary embolism (PE) candidate and PE boundary from a voxel comprises tobogganing the voxel to a first concentration voxel, initializing a cluster with the first concentration voxel, and assigning to an active list all neighboring voxels whose intensity is indicative of being part of an embolism, removing a voxel with a minimal intensity from the active list, tobogganing the removed voxel to a second concentration voxel, where if the second concentration voxel is part of the cluster, assigning neighbors of the removed voxel to the active list, otherwise assigning the removed voxel to a boundary of the cluster, and repeating the steps of removing a voxel from the active list and tobogganing the removed voxel to a second concentration voxel until the active list is empty, where the cluster is the pulmonary embolism candidate.

According to a further aspect of the invention, tobogganing a voxel comprises finding a concentration voxel from among the voxel and its neighboring voxels that has a minimum intensity.

According to a further aspect of the invention, the method includes adding the removed voxel to the cluster, when the second concentration voxel is part of the cluster.

According to a further aspect of the invention, the method includes classifying the pulmonary embolism candidate as a true candidate or a false candidate by calculating an image-based feature vector x for the candidate and comparing the feature vector to a classification function $w^T x+b$ which divides a feature space into a false candidate space and a true candidate space.

According to a further aspect of the invention, the classifier function coefficients w and intercepts b are found by solving $$\min_{w,\xi} \gamma \|w\|_1 + \sum_{j=1}^{m} \left( \sum i \in I_j \lambda_i \xi_i \right) + \sum i \in I - \xi_i,$$

$$\text{s.t. } w^T x_i + b \geq 1 - \xi_i, i \in I^+, I^+ = \bigcup_{j=1}^{m} I_j$$

$$w^T x_i + b \leq -1 + \xi_i, i \in I^-,$$

$$\xi_i \geq 0, i = 1, \ldots, l,$$

$$\sum i \in I_j \lambda_i = 1, \lambda_i \geq 0, i \in I_j, j = 1, \ldots, m,$$

for a training set of true and false pulmonary embolism candidates, where $I^+$ and $I^-$ are index sets containing indices of true candidates that intersect with PEs and false candidates that do not intersect with PEs, respectively, and $I_j$ is an index set of the candidates that intersect with a $j^{th}$ PE, $j=1, \ldots, m$.

According to a further aspect of the invention, an intensity indicative of being part of an embolism is in the range of between about −50 Hounsfield Units (HU) and about 100 HU.

According to another aspect of the invention, there is provided a program storage device readable by a computer, tangibly embodying a program of instructions executable by the computer to perform the method steps for detecting pulmonary embolisms in computed tomographic (CT) angiography.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein:

FIGS. 2(a)-(b) illustrate PE detection with a basic tobogganing algorithm, according to an exemplary embodiment of the present invention;

FIGS. 3(a)-(d) illustrate the use of a concentration-oriented toboggan algorithm; for PE detection according to an exemplary embodiment of the present invention;

FIG. 6 presents pseudo-code of a basic tobogganing algorithm, according to an exemplary embodiment of the present invention;

FIG. 7 presents pseudo-code of an exemplary concentration oriented tobogganing algorithm according to an exemplary embodiment of the present invention;

FIG. 8 presents pseudo-code of a loop for interactively invoking the concentration oriented tobogganing algorithm of FIG. 7, according to an exemplary embodiment of the present invention;

DETAILED DESCRIPTION OF THE DRAWINGS

Figure 1:
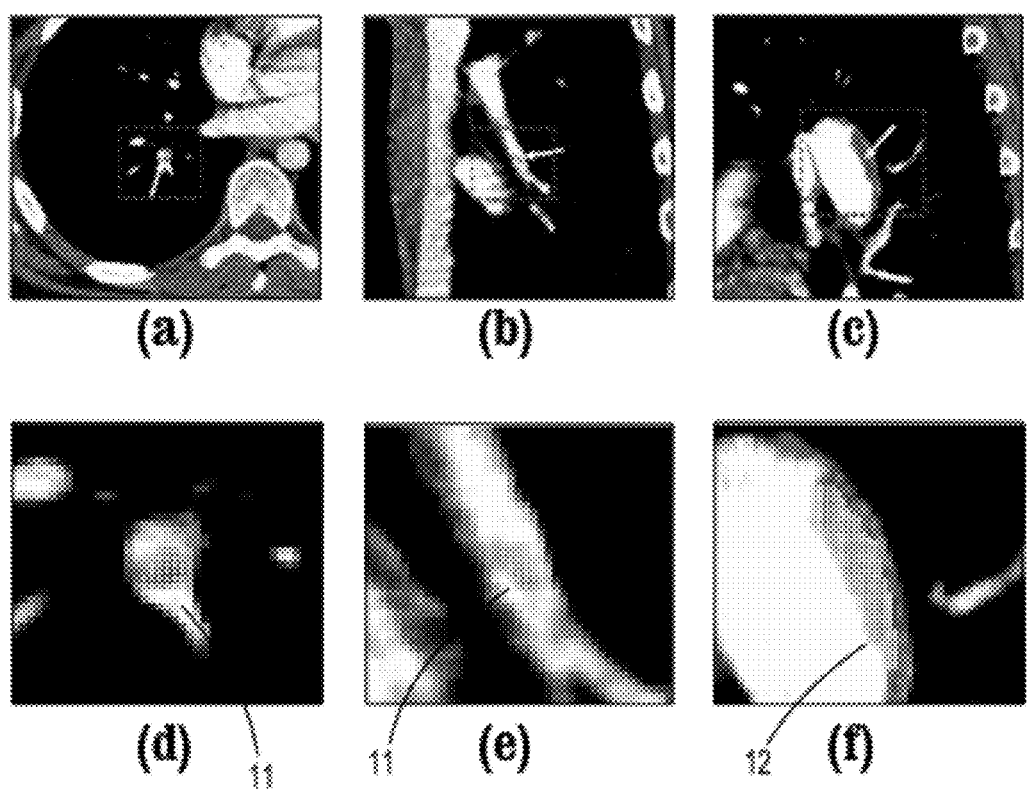
FIGS. 1(a)-(f) illustrate exemplary pulmonary embolisms, according to an exemplary embodiment of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

As used herein, the term "image" may refer to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from R3 to R, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Exemplary embodiments of the present invention seek to provide a method for analyzing a PE candidate within medical image data to determine whether the PE candidate is a true PE or a false positive based on a novel application of various local candidate characteristic features that are applied to measure the spatial independence of the voxels of the PE candidate. After the analysis has been made, those PE candidates that have been determined to be false positives may be rejected and those PE candidates that have been determined to be true PEs may be brought to the attention of a trained medical practitioner such as a radiologist. By combining this approach for validating PE candidates with approaches for automatically identifying PE candidates within medical image data, potentially fatal PEs may be quickly and accurately detected within medical image data so that lifesaving treatment may be provided in a timely manner.

PE detection may impose a unique classification problem with several distinct aspects from the traditional multiple instance learning (MIL) problems investigated in the art of machine learning. An objective of traditional MIL is to distinguish bags, each of which may have multiple instances. This implies that labels, positive or negative, are associated with the bags rather than their instances, and each instance exclusively belongs to a bag. The bag information may always be present throughout both training and testing phases, and it may be utilized by the trained classifiers during run-time. However, in PE detection, our at least one candidate may be correctly detected from each true PE. Therefore, in a training phase, based on the ground truth provided by radiologists, it may be determined which candidate belongs to which true PE. As a result, one may regard each true PE as a bag and its candidates as instances of the bag. However, there are no negative bags but only negative instances (false positive candidates), even though one may create virtual negative bags by regarding each individual negative instance as a negative bag with a single instance.

For PE detection, such bag information may not be available at all in run-time, therefore, one or more trained classifiers may be independent from the bag information in testing phase and nm-time. Additional false positives may be eliminated by selectively sacrificing the redundant true PE candidates (instances in positive bags) without hurting overall detection sensitivity, but the ultimate objective remains to classify instances rather bags.

Consequently, exemplary embodiments of the present invention may utilize multiple instance based learning (MIBL), and herein may refer the traditional MIL as bag-based multiple instance learning. Nevertheless, the learning algorithm selected is applicable to the traditional MIL problems, when correctly classifying one instance in a bag implies correct classification of the bag. It may be expected that this multiple instance based learning will have many applications in other domains.

The three set of features described in detail below may also be unique in detecting PEs, as they may be applied to the exacted candidates or their surroundings. In the existing art, none of these features have been applied for PE detection.

Figure 9:
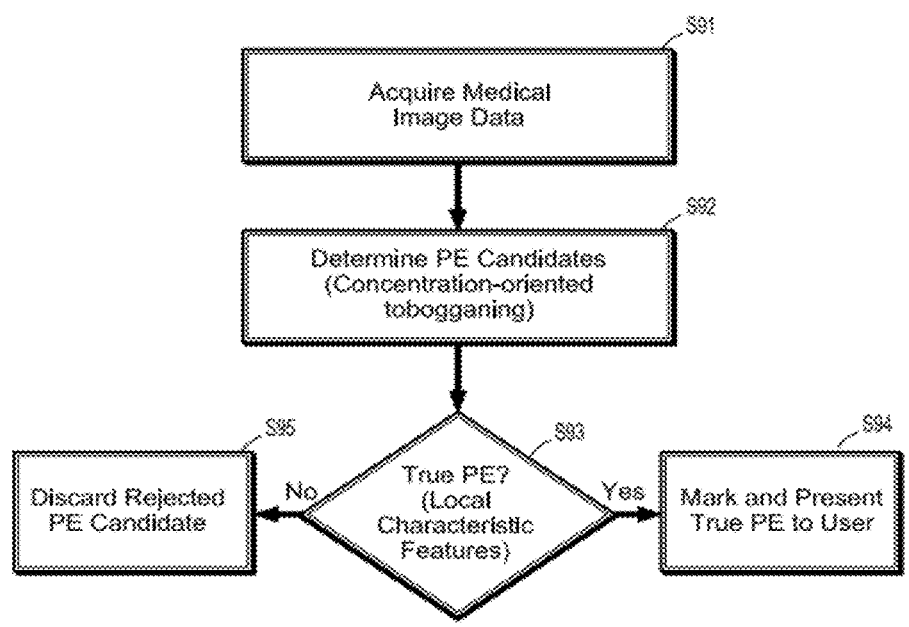
FIG. 9 is a flow chart illustrating an overview of the process for automatic detection of pulmonary emboli according to an exemplary embodiment of the present invention.

Exemplary embodiments of the present invention may be applied to the field of computer aided detection (CAD) of pulmonary emboli. FIG. 9 is a flow chart illustrating an overview of the process for automatic detection of pulmonary emboli according to an exemplary embodiment of the present invention. First, medical image data may be acquired (Step S91). The medical image data may be acquired, for example, using a computed tomography (CT) scanner which creates three-dimensional image volume data. The image volume data may then be analyzed to determine one or more PE candidates (Step S92). This step may be known as "candidate generation." Here, a direct search is performed for regions that may be suspicious for resembling a PE. As will be discussed in detail below, exemplary embodiments of the present invention may utilize a novel concentration-oriented tobogganing approach to provide a high degree of sensitivity while minimizing false positives. As this approach for generating PE candidates may generate multiple PE candidates for each true PE, a unique multiple-instance based learning strategy may be used to train a multiple instance based classifier to effectively eliminate the false positives, thereby ensuring clinical acceptance. As the usefulness of a classifier may rely on discriminative features, local characteristic features such as intensity, texture and shape may be used to generate the PE candidates.

As discussed above, traditional approaches to generating PE candidates often include a complete segmentation of the pulmonary vessel tree, however, modern techniques, for example, such as those discussed in detail below, may provide for PE candidate identification that is faster and more accurate than existing techniques that involve vessel tree segmentation.

After one or more PE candidates have been identified, it may be determined whether each candidate is a true PE or a false positive (Step S93). This step may include forming a feature vector from the extracted features, so that a multiple instance based classifier may be trained using a learning strategy. Then, a final classification of true PE or false positive may be rendered based on the assessment of the trained classifiers on the feature vectors for each PE candidate.

If it is determined that the PE candidate is a true PE (Yes, Step S93), then the candidate may be marked or otherwise brought to the attention of a medical practitioner such as a radiologist (Step S94). If, however, it is determined that the PE candidate is a false positive and thus not a true PE (No, Step S93), then the PE candidate may be discarded (Step S95). The determination of whether the PE candidate is a true PE (Step S93) may be repeated for each PE candidate that is found in step S92.

Exemplary embodiments of the present invention provide a novel approach for performing the assessment of Step S93 that, as described above, involves application of various local candidate characteristic features that are applied to measure the spatial independence of the voxels of the PE candidate. This assessment step may be multifaceted and even after a PE candidate is not rejected as a false positive by one approach, multiple approaches may be applied in series to remove false positives from the PE candidate pool. Here each approach may be optimized to identify a particular type of false positive.

However, prior to providing a detailed description of the novel assessment of Step S93, the automatic detection of PE candidates of Step S92 will first be described.

Automatic detection of PE candidates may include a technique known as basic tobogganing. This technique begins with the assumption that pulmonary emboli may only exist in pulmonary arteries and are generally attached to the vessel wall. FIGS. 1(*a*)-(*f*) illustrate some exemplary PEs. FIGS. 1(*a*) and (*b*) depict acute emboli, while FIG. 1(*c*) depicts a chronic embolism. The emboli appear as dark regions residing in bright vessel lumen, and are in the boxed regions of FIGS. 1(*a*)-(*c*). Toboggan-based approaches, according to exemplary embodiments of the present invention, are capable of detecting both acute and chronic emboli, offering simultaneous detection and segmentation, shown respectively in FIGS. 1(*d*), (*e*), and (*f*). The acute emboli are indicated by reference number 11, while the chronic embolism is indicated by reference number 12. The clot in FIG. 1(*b*) is of a type that may easily be missed by a radiologist, but correctly detected by a system according to an exemplary embodiment of the invention, and confirmed by the radiologist. Due to the nature of the formulation of PEs, CTPA may be used to reveal emboli, whether acute or chronic, as dark regions with Hounsfield Units (HU) between about −50 HU and about 100 HU, residing in contrast enhanced bright vessel lumen. However, due to partial volume effects, the pixels around the vessel boundaries may also be in the same HU range. Therefore, a challenge for automatic PE detection is to effectively separate the emboli from the vessel wall and to quickly remove partial volume effects around the vessel boundaries while correctly preserving the PE pixels.

In response to this challenge, exemplary embodiments of the present invention may "slide" all the voxels with Hounsfield Units (HU) between −50 HU and 100 HU to a neighbor with minimal HU value and all voxels that are not slid into regions with Hounsfield Unit below −50 HU are collected. Here, sliding of voxels refers to the process of relocating the intensity value of a given voxel to an adjacent voxel. It is this sliding of voxels that has led to the technique being referred to as "tobogganing."

Figure 2B:
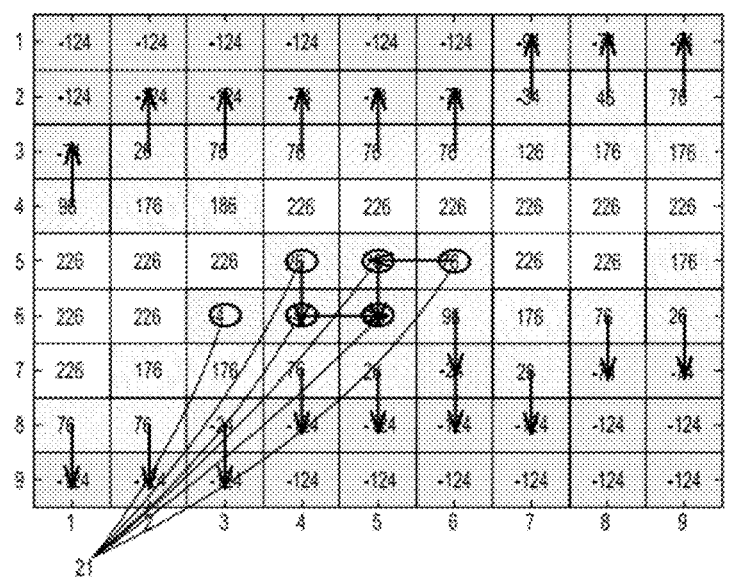

FIGS. 2(a)-(b) illustrate PE candidate detection with a basic tobogganing algorithm as summarized in FIG. 6, described below. In this small PE image, voxels with CT values below −50 HU are in dark gray squares, pixels with CT value above 100 HU are in white squares and all other voxels are in light gray squares. All the voxels of the PE candidate are shown in the light gray squares. The arrows indicate the directions in which voxels are slid. However, due to partial volume effects, the voxels around the artery boundaries are also light gray. Exemplary embodiments of the present invention may be able to effectively detect the PE candidate, indicated by reference nos. 21 in FIG. 2(b), and remove the partial volume effects.

A basic tobogganing method according to an exemplary embodiment of the invention is summarized as Algorithm 1 in FIG. 6 and described as follows. Tobogganing takes its name from the analogy of sliding down a steep hill and will be referred as "basic tobogganing" herein below to be differentiated from concentration oriented tobogganing, also described below.

A basic operation in tobogganing is "sliding". A voxel v with intensity P(v) and neighbors N(v) slides down to voxel g, for example, in accordance with the following equation:

$$g = \underset{i \in N(v) \cup \{v\}}{\operatorname{argmin}} P(t). \quad (1)$$

In cases where a voxel is surrounded by more than one neighboring voxel with the same minimal intensity value, the first voxel found with the minimal value can be chosen, or other more sophisticated strategies may be used in selecting a neighbor. A voxel that cannot slide to any of its neighbors is called a concentration. All the voxels that slide down to the same concentration form a toboggan cluster with a unique label.

Referring now to Algorithm 1 of FIG. 6, the basic tobogganing algorithm operates as follows. The algorithm determines a label for a PE candidate voxel. It may generate a different label for each toboggan cluster, but for the purpose of PE candidate detection, a single unique label is sufficient, since connected component analysis may be performed to merge all the collected PE voxels into a PE candidate. The output l=L(v) may be regarded as a function, which has predetermined label for some voxel v. In PE candidate detection, those voxels whose potential is below the low threshold ("air") or above the high threshold ("contrast") need not be subjected to tobogganing. Moreover, tobogganing may also be omitted for voxels occurring outside of the lung. A determination as to which voxels constitute the lung may be made by a preliminary segmentation. It is to be noted, however, that segmentation of the lung may be far less time consuming and computationally expensive as segmenting the pulmonary vessel tree. Accordingly, initially, $$L(v) = \begin{cases} \text{"out"} & \text{if } v \text{ is outside of the lungs} \\ \text{"air"} & \text{if } P(v) < lt, \\ \text{"contrast"} & \text{if } P(v) > ht, \\ \text{"nil"} & \text{otherwise,} \end{cases} \quad (2)$$

A tobogganing algorithm for PE candidate detection may be regarded as a process that determines the label for those voxels with initial label of nil. Then, for each voxel v that is unlabeled, initializations are performed at Step A. At Step B, each unlabeled voxel slides until reaching a labeled voxel or an unlabeled new concentration. The sliding function, tob( ), implements EQ. (1). If a slid voxel reaches a labeled voxel, the label is propagated back to all the pixels along the sliding path at Step D, otherwise, at Step C, a new label is generated and then propagated back along the path. All the sliding directions are recorded during the process.

The function r=peLabel( ) may be used to determine a label for a PE voxel. It may generate a different label for each toboggan cluster, but for the purpose of PE detection, a single unique label is sufficient, since connected component analysis may be performed in order to merge all the collected PE voxels into a detection.

Referring to the simple PE image of FIG. 2(a), for detecting the PE candidate, the image may be scanned row by row and those voxels with CT values between −50 HU and 100 HU are selectively slid. For illustration, an exemplary, non-limiting 2D four-connected neighborhood is used. Referring now to FIG. 2(b), the arrows indicate the sliding directions. During the tobogganing, the first pixel with CT value between −50 HU and 100 HU is pixel (7,2), which slides towards to pixel (7,1). Since the CT value of pixel (7,1) is −74 HU, and is pre-labeled as "air", label "air" is propagated back to pixel (7,2). During the tobogganing process, the first pixel collected as PE pixel is pixel (4,5), because it slides down to pixel (4,6) and then concentrates at pixel (5,6) with CT value above −50 HU. Consequently, a PE label is generated and assigned to pixel (5,6) and propagated back to pixels (4,6) and (4,5). When it is done for all the pixels in the image, the light gray pixels around the arteries have all merged into darker regions with CT values below −50 HU and all the PE pixels stand out, which are circled in FIG. 2(b). In this example, two toboggan clusters are formed for the detected PE candidate pixels: the pixel (3,6) is a single-pixel toboggan cluster, while the other pixels form one cluster with concentration at pixel (5,6), indicated by the lines connecting them in FIG. 2(b). To achieve the goal of PE candidate detection, the adjacent toboggan clusters (with detected PE pixels) may be merged into a connected component, called a PE candidate, so that a detection position (3D point) can be derived by ultimate erosion to represent the candidate.

This basic tobogganing algorithm is intuitive and useful in detecting PE candidates. This approach provides labels to PE voxels. Then a PE candidate may be determined by grouping the detected PE pixels into connected components. Accordingly, the whole volume is scanned at least twice: once for tobogganing and the second time for connected component analysis before reporting any detected PE candidates. The medical practitioner must therefore wait for the completion of two scans before reviewing the detected PE candidates.

During the search for PE candidates according to an exemplary embodiment of the present invention, whole PE candidates may be extracted from a detected PE voxel and then the PE candidate may be sent to the medical practitioner for immediate review. As each PE candidate may include multiple toboggan clusters, the tobogganing approach should be able to extract a toboggan cluster from any given voxel and provide the external boundary voxels of the cluster.

A process for extracting a toboggan cluster from a given voxel according to an exemplary embodiment of the present invention, referred to herein below as Algorithm 2, is presented in FIG. 7, which may be interactively invoked for detecting PE candidates by Algorithm 3, presented in FIG. 8.

FIGS. 3(a)-(d) illustrates the use of a concentration-oriented tobogganing algorithm for PE candidate detection according to an exemplary embodiment of the present invention. Referring to Algorithm 2, a concentration oriented tobogganing algorithm according to an exemplary embodiment of the present invention may include two steps. It first may search for a concentration c from a given voxel s using the tob( ) function at Step A, and then, at Step B, the found concentration c, whose CT intensity value is in the PE intensity range, may be expanded to extract the whole toboggan cluster C. The expansion may include a base step (Step B.1) and an iterative step (Step B.2). In the base step B.1, it includes the concentration c as the first voxel in the cluster and pushes all its neighbors with CT values between −50 HU and 100 HU onto an active list A. The conditions for selecting voxels for the active list can be expressed as:

$$\forall r \in N(v), A \leftarrow r \text{ if } (r \notin A) \text{ and } (r \notin C) \text{ and } (P(r) \in [lt, ht]). \quad (3)$$

In the iterative step B.2, it selects voxel q with the minimal CT value from the active list A: $q = \arg \min_{a \in A} P(a)$. If the selected voxel toboggans to an already clustered voxel, then it conditionally pushes its neighbors to the active list A to ensure the uniqueness of the voxels in the active list. Otherwise, the selected voxel belongs to the cluster's external boundary B. The iterative step is repeated till the active list A is empty. This concentration oriented tobogganing algorithm is repeatedly applied on all those external boundary voxels, until a whole PE candidate has been extracted.

Figure 3A:
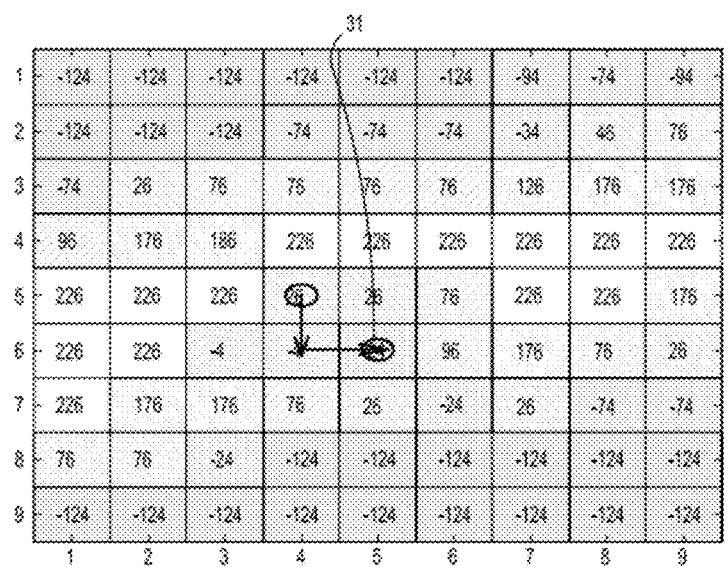
Figure 3B:
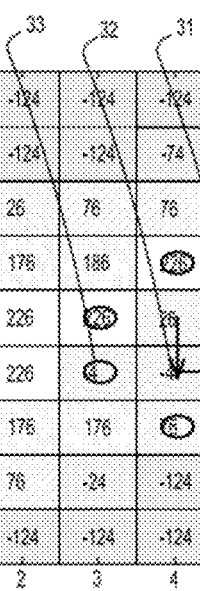
Figure 3C:
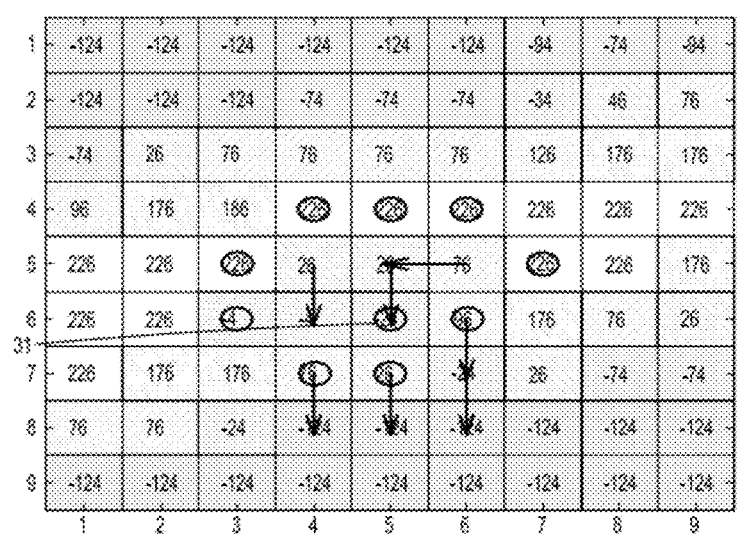

Referring to FIGS. 3(a)-(d), when the example image is scanned row by row, the first PE voxel encountered is (4,5), because it does not merge into regions with CT value below −50 HU. Therefore, it is desired to extract the whole PE candidate from the voxel at (4,5). Voxel (4,5) is circled in FIG. 3(a). FIG. 3(a) illustrates Step A of the algorithm: finding the concentration. It regards the starting location as the current location, slides it to its neighbor with minimal CT value, as indicated by the arrows in FIG. 3(a), then selects the neighbor as the current location and slides it until reaching a concentration. Once the concentration is found, indicated by reference number 31, if its CT value is between −50 HU and 100 HU, Step B is initiated to expand from the concentration to cover a whole toboggan cluster and provide all the external boundary voxels, the other circled voxels, as shown in FIG. 3(b). In this example, the concentration (5,6) is included into the cluster and then all its neighbors with CT values in the PE HU range are pushed into an active list. A voxel with the minimal CT value is selected from the active list. In this case, it is voxel (4,6), indicated by reference number 32. Since it slides towards voxel (5,6), which has been included into the cluster, its neighbors are conditionally pushed into the active list. The condition is that the neighbor must have CT value in the PE HU range, and has not been included in the cluster and the active list, as expressed in EQ. (3), above. A new voxel with the minimal CT value is selected from the active list. For this time, it is voxel (3,6), reference number 33, but it does not slides towards any voxels within the cluster, therefore, it is a voxel on the external boundary of the cluster, and no processing is performed on its neighbors. A new voxel is repeatedly selected from the active list and is processed it in the same way until the active list is empty. Once done, all the voxels within the cluster, namely, (4,5), (4,6), (5,5), (5,6) and (6,5), as well as the voxels along the external boundary of the cluster (circled in FIG. 3(b)) may be obtained. The concentration oriented tobogganing algorithm is then iteratively applied on each of the external boundary voxels with CT value in the PE HU range as indicated in FIG. 3(c).

An exemplary iterative loop according to an exemplary embodiment of the present invention may embed a call to the concentration oriented tobogganing algorithm as presented in FIG. 8 as Algorithm 3. Referring to Algorithm 3, the concentration oriented tobogganing algorithm of Algorithm 2, denoted in Algorithm 3 as COT(s,p,lt,ht), is called for each voxel in the image. Then, for each non-empty cluster returned, the COT(s,p,lt,ht) is called for each of the boundary voxels. Any additional extracted toboggan cluster is merged into the previously extracted toboggan clusters, and any additional external boundary voxels are also merged.

For the purposes of illustrating exemplary embodiments of the present invention, feature computation and classification (FC( . . . ) and CLS( . . . )) are included in Algorithm 3, but these features may be implemented separately in multi-threaded environment to support a dynamic, non-pipeline architecture.

Figure 3D:
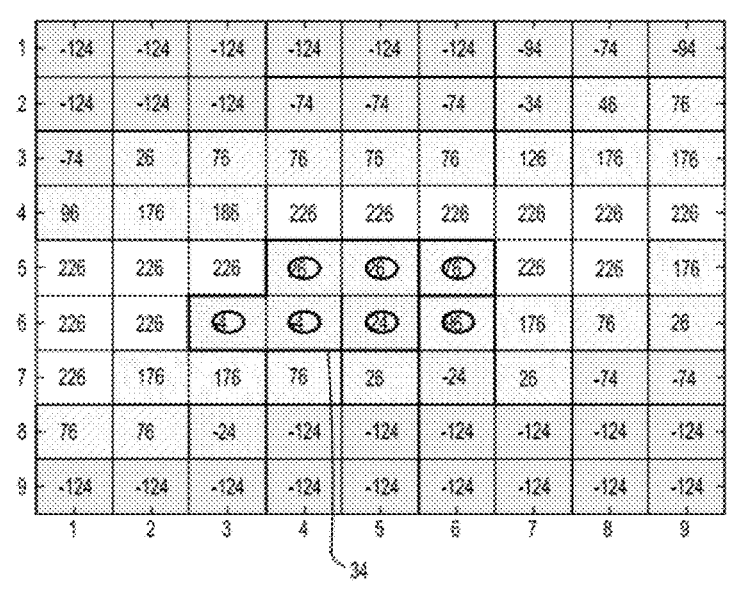

Once no external boundary voxels are left, each of the toboggan clusters may be extracted and merged to automatically form a connected component 34, shown in FIG. 3(d). The connected component may be a PE candidate. This result is identical to that depicted in FIG. 2(b). Accordingly, Algorithm 3 may provide similar PE candidate detections as Algorithm 1, but Algorithm 3 may also be able to immediately report the detection of PE candidates as they are found during searching.

For testing a toboggan-based detection algorithm according to an embodiment of the invention, there were collected 177 cases with 872 clots marked by expert chest radiologists at four different institutions (two North American sites and two European sites). They are divided into two sets: training (45 cases with 156 clots) and testing (132 cases with 716 clots). The training cases were used in the development process for algorithm developing, improving and testing, while the testing cases were only used for algorithm testing and were never used for development.

All 177 cases were processed with a concentration oriented algorithm according to an embodiment of the invention, which generated a total of 8806 candidates: 2431 candidates appear in the training set and 6375 candidates in the test set. Each candidate is a connected component—a cluster of voxels, and represented by a representative point with a 3-D coordinate derived from the cluster of voxels.

Each candidate was then labeled as a PE or not based on 3-D landmark ground truth provided by the experts. To automatically label each candidate, each PE identified by an expert landmark is semi-automatically extracted and segmented. Therefore, the ground truth for each PE is also a cluster of voxels, that is, the segmented PE. Any candidate that was found to intersect with any of the segmented PEs in the ground truth was labeled as a PE. Multiple candidates may intersect with the same segmented PE, that is, multiple candidates may correspond to a single PE. Each PE is assigned with a unique identifier; therefore, multiple candidates may be labeled with the same PE identifier.

An algorithm according to an embodiment of the invention successfully detected 90.38% ($^{141}/_{156}$) of the PE in the training cases and 90.1% ($^{645}/_{716}$) of the PE in the testing cases. On average, the total computation time for each case is about 2 minutes on a 2.4 GHz P4 PC and the first detection, if any, in a case is reported within 27 seconds. However, on average, a concentration oriented algorithm according to an embodiment of the invention also produces candidates that do not intersect with any PEs. These candidates are regarded as false positives. On average, 47.5 and 40.3 false positives for each case are generated for the training set and the test set, respectively. However, a system that "cries wolf" too often will be rejected out of hand by radiologists. Thus, it is desired to detect as many true PEs as possible, subject to a constraint on false positives, usually less than or equal to 4 false positives per case. Therefore, according to an embodiment of the invention, a novel classification framework is provided based on mathematical programming to reduce the occurrence of false positives. The results are summarized in the following table.

| Dataset | Trailing | Testing |
| --- | --- | --- |
| No. Candidates | 2431 | 6375 |
| No. PEs in ground truth | 156 | 716 |
| No. PEs detected in candidates | 141 | 645 |
| No. false positives | 47.5 | 40.3 |

For clinical acceptability, it is useful to control false positive rates and detect as any true PEs as possible. A PE can be large, or have an elongated shape along the vessel, or split at a vessel bifurcation. Multiple candidate clusters can exist to intersect with a single PE. As long as one of the candidates is identified and visualized to a physician, the entire PE can be easily traced out. Consequently, it is sufficient to detect one candidate for each PE. Correct classification of every candidate instance is not as important as the ability to detect at least one candidate for each PE.

To reduce false positives by classification, a set of 116 descriptive properties of a candidates, called features, are computed. These features were all image-based features and were normalized to a unit range, with a feature-specific mean. The features can be categorized into those that are indicative of voxel intensity distributions within the candidate, those summarizing distributions in neighborhood of the candidate, and those that describe the 3-D shape of the candidate and enclosing structures. When combined, these features can capture candidate properties that can disambiguate typical false positives, such as dark areas that result from poor mixing of bright contrast agents with blood in veins, and dark connective tissues between vessels, from true emboli. These features are not necessarily independent, and may be correlated with each other, especially with features in the same group.

Assuming that a total of l PE candidates are extracted in performance of tobogganing, each represented by a feature vector $x_i$ associated with a label $y_i$. The label $y_i=1$ may be applied if the PE candidate overlays another PE candidate, otherwise $y_i=-1$ may be applied. Let $I^+$ and $I^-$ be two index sets containing indices of PE candidates that intersect with other PE candidates and do not intersect with other PE candidates, respectively. Let m be the total number of PE candidates marked by a medical practitioner for the n images. Denote $I_j$ as the index set of the candidates that intersect with the $j^{th}$ PE, j=1, ..., m. Notice that although $\cup_{j=1, ..., m} I_j = I^+$, any two index sets $I_j$'s are not necessarily disjoint since there may exist a candidate cluster that intersects with more than one segmented PE candidate.

A support vector machine (SVM) may be used to provide classification and regression. It constructs linear classification functions of the form $w^T x+b$ by minimizing a hinge error defined as $\xi=\max\{0, 1-y(w^T x)\}$ for all PE candidates. According to an exemplary embodiment of the present invention, an effective classification approach can be derived by exploring the observation that once a PE candidate in $I_j$ is classified as a positive then the $j^{th}$ PE candidate may be considered identified. This consideration motivates the resulting classifier to focus on different PE candidates instead of multiple PE candidates within a single suspected PE. This practice may accordingly facilitate the reduction of false positives by ignoring possibly extremely noisy candidates that intersect with some PE candidates where, for the same suspected PE, other associated PE candidates can be easily classified correctly.

Figure 4A:
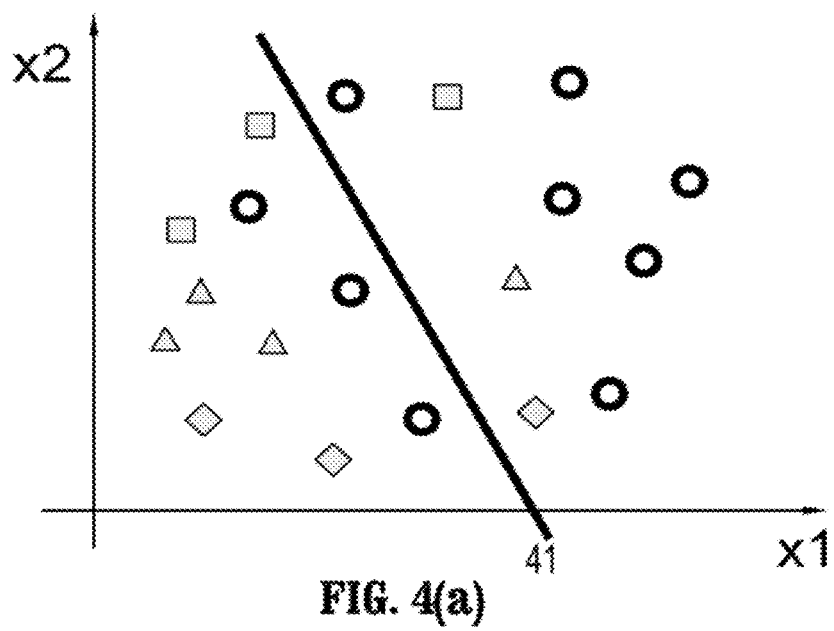
FIGS. 4(a)-(b) illustrate a geometric interpretation of a Support Vector Machine in a 2-D feature space according to an exemplary embodiment of the present invention.
Figure 4B:
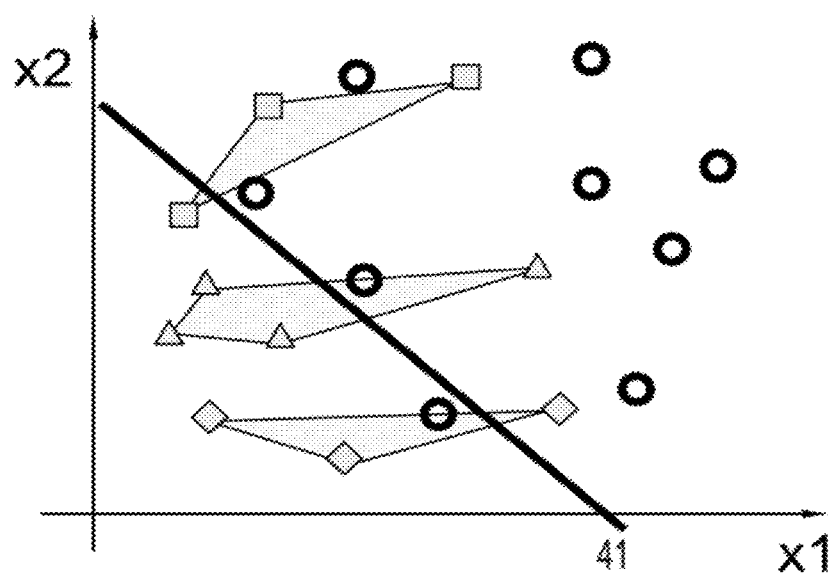

FIGS. 4(a)-(b) illustrate a geometric interpretation of an SVM in a 2-D feature space. A standard SVM, shown in FIG. 4(a), focuses on separating all candidates to correct sides. The line 41 is the linear separation boundary computed by a standard SVM, where circles represent false detections, and the symbols (diamond, box and delta) each represents one suspected PE with multiple candidates. On the other hand, a multiple instance learning algorithm according to an exemplary embodiment of the present invention, illustrated in FIG. 4(b), classifies at least one true PE candidate into one side and others on the other side, thus successfully removing all negative detections. One result of this is that the separation boundary 41 may be shifted or rotated. The diamonds, boxes, and triangle symbols are respectively connected in FIG. 4(b) to indicate that they are part of the same PE. However, only one detection for each candidate needs to be classified correctly.

Mathematically, distinguishing at least one PE candidate for each suspected PE from the negative class is equivalent to the statement that as long as the minimum number of the errors ($\xi$) associated with the PE candidates associated with a suspected PE is 0, then that suspected PE is detected. For example, if a suspected PE is associated with three PE candidates, and a classifier generates $\xi_1=0$ for the first candidate, and $\xi_2=5$, $\xi_3=100$ for the other two candidates, the classifier detects the suspected PE. Correspondingly, this implies constructing the classifier by solving the following optimization program:

$$\min_{w,\xi} \gamma \|w\|_1 + \sum_{j=1}^{m} \min\{\xi_i, i \in I_j\} + \sum i \in I^- \xi_i, \quad (4)$$

$$\text{s.t. } w^T x_i + b \geq 1 - \xi_i, i \in I^+, I^+ = \bigcup_{j=1}^{m} I_j$$

$$w^T x_i + b \leq -1 + \xi_i, i \in I^-,$$

$$\xi_i \geq 0, i = 1, \ldots, l.$$

This optimization program may be computationally difficult to solve since it involves a minimization of the to-be-determined variables $\xi$ in the evaluation of the objective function, and is neither differentiable nor convex. Hence an equivalent conversion of the program to a more tractable optimization program is desired. The following quadratic program is equivalent to program (4). Any solution $\hat{w}$ of Program (4) is also an optimal solution to Program (5) with properly chosen $\lambda$, and vice versa.

$$\min_{w,\xi} \gamma \|w\|_1 + \sum_{j=1}^{m} (\sum i \in I_j \lambda_i \xi_i) + \sum i \in I^- \xi_i, \quad (5)$$

$$\text{s.t. } w^T x_i + b \geq 1 - \xi_i, i \in I^+, I^+ = \bigcup_{j=1}^{m} I_j$$

-continued $$w^T x_i + b \leq -1 + \xi_i, i \in I^-,$$

$$\xi_i \geq 0, i = 1, \ldots, l,$$

$$\sum i \in I_j \lambda_i = 1, \lambda_i \geq 0, i \in I_j, j = 1, \ldots, m.$$

When Programs (4) or (5) have been solved on a training set of suspected PEs, the resulting classifier wTx+b can be applied to any newly detected PE candidate to determine with an increased confidence whether the candidate is a PE. For a newly detected PE candidate, a feature vector x is calculated and compared to the classifier wTx+b, which separates the feature space into a true candidate space and a false candidate space.

Figure 5:
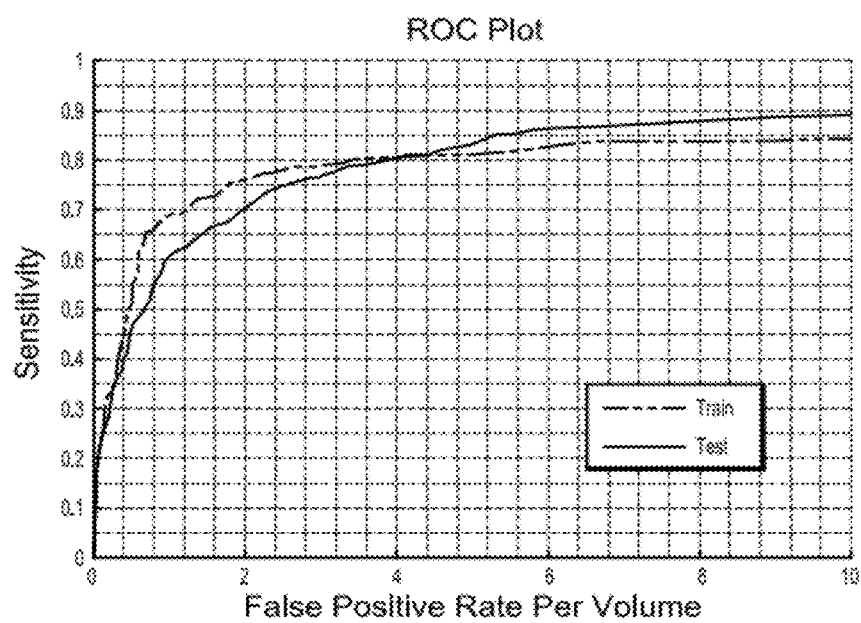
FIG. 5 depicts the Receiver Operating Characteristics plot of a system that combines candidate detection, feature computation, and classification, according to an exemplary embodiment of the present invention.

A classification algorithm according to an exemplary embodiment of the present invention can reduce the false positive rate while maintaining a high detection sensitivity. FIG. 5 depicts the Receiver Operating Characteristics (ROC) plot of a final system according to an exemplary embodiment of the invention that combines the candidate detection, feature computation, and classification. As shown in FIG. 5, the final system detects 80% of the PEs, respectively, for the training study set and the test set at 4 false positive per patient.

In addition to, or in place of the use of the classification algorithms discussed above, exemplary embodiments of the present invention may employ one or more novel approaches to determining whether detected PE candidates are true PEs or false positives. Accordingly, efficient, local feature extraction may be performed distinctly to identify various different forms of false positives and remove them from consideration.

As false positives are often the result of noise in the medical image data, the presence of poorly mixed contrast agent seen in the veins, and/or the mischaracterization of connective (lymph) tissue, etc., exemplary embodiments of the present invention seek to distinguish false positives from true PEs by examining features that are based on the spatial distribution of intensity values computed within the candidate cluster. Subtle variations in the distribution of intensity values may reveal clues as to the nature of the PE candidate, and looking at the right set of features may be a highly effective means for successfully characterizing each PE candidate.

Accordingly, exemplary embodiments of the present invention may eliminate false positives using three sets of local characteristic features: (1) features based on local candidate co-occurrence matrices to remove false detections induced by noise and poorly mixed contrast; (2) features characterizing vessel properties to eliminate candidates outside of vessel, and (3) features discriminating between arteries and veins to remove candidates from veins. Since the total number of candidates is rather limited (under 50 on average) in each case, and it is much more efficient to compute the features descriptive to the local vascular structure of a candidate than segmenting the whole pulmonary vascular tree, it may be more efficient to eliminate false positives through local characteristic features then to segment the entire vessel structure.

Thereafter, exemplary embodiments of the present invention may utilize an efficient, multiple instance based learning and classification approach to effectively reduce false positives. For clinical acceptability, false positive rates should be minimized while ensuring that as many true PEs as possible are detected. A PE is a clot in the blood vessel. It may be large, have an elongated shape along the vessel, or split at the vessel bifurcation. Accordingly, multiple PE candidates may be generated for a single true PE. Once one of the candidates is identified and highlighted, physicians can easily trace out the entire PE. Thus, the correct classification of every candidates is not as important as the ability to correctly detect at least one candidate that points to a true PE. Multiple instance based classification may be used to eliminate more false positives by selectively sacrificing the redundant true PE candidates without hurting detection sensitivity.

Although the developed classification algorithm can employ a kernel function to construct non-linear classifiers, exemplary embodiments of the present invention may build linear classifiers for computation efficiency, robustness and generalization.

Many existing CAD systems adopts a pipeline architecture and only report the final detection at the end of execution, implying that the radiologist has to wait until the end of the system run in order to review and approve any detections. However, in an ER (Emergency Room) scenario, radiologists only have a small time window (2-3 minutes) to read a case and make the diagnosis. They cannot wait till the end of run to examine all the CAD detection. Accordingly, exemplary embodiments of the present invention may report a PE detection as they become available in real-time for radiologist to review and approve, while the CAD system continues searching for additional PEs.

When a candidate is generated in accordance with concentration-oriented tobogganing, the three sets of local characteristic features may be computed immediately to form a feature vector, and the pre-trained multiple instance based classifier may be applied to classify the candidate as "PE" or "non-PE", so that the radiologist can review any classified PE candidate right away without waiting for all the candidates being processed.

Figure 10:
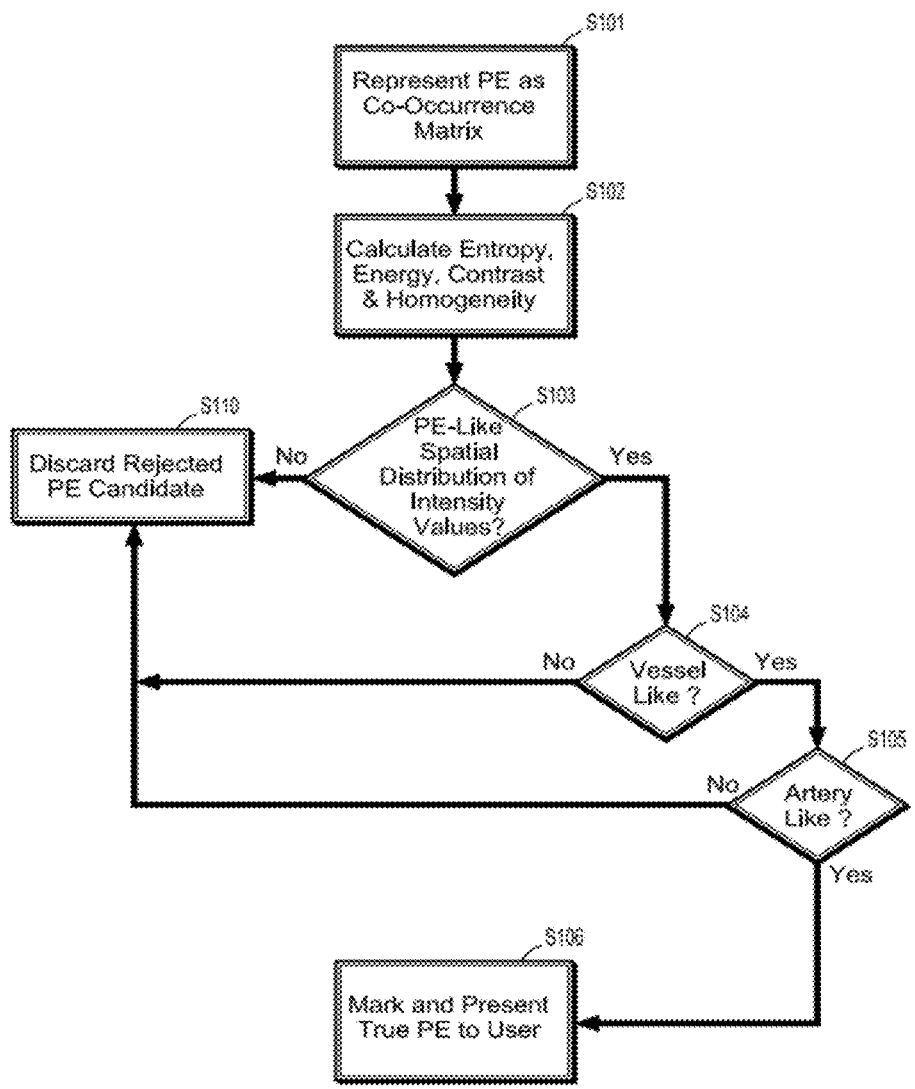
FIG. 10 is a flow chart illustrating a method for determining whether a PE candidate is a false positive or a true PE according to an exemplary embodiment of the present invention.

FIG. 10 is a flow chart illustrating a method for determining whether a PE candidate is a false positive or a true PE according to an exemplary embodiment of the present invention. First, for each PE candidate, the distribution of the voxel intensity values may be represented by a gray level co-occurrence matrix (Step S101). The co-occurrence matrix is an approach for capturing the spatial dependency of intensity values within an image using second-order statistics. For a given three-dimensional volume I of $n_1 \times n \times n_3$ and a number of intensity levels N, a co-occurrence matrix C may be represented as an N×N matrix. This matrix may act as an accumulator over the image I. For example, a co-occurrence matrix along a direction $(d_x, d_y, d_z)$ may be defined as follows: otherwise $$C_d(i, j) = \sum_{x=1}^{n1} \sum_{y=1}^{n2} \sum_{z=1}^{n3} \begin{cases} 1, & \text{if } I(x, y, z) = I \text{ \& } I(x+dx, y+dy, z+dz) = j \\ 0, & \text{otherwise} \end{cases} \quad (6)$$

As applied to PE candidate analysis, the co-occurrence matrix may represent the spatial dependency of the intensity values for each voxel within a given PE candidate. A distinct co-occurrence matrix may be set up for each PE candidate.

In addition to basic intensity distribution features such as mean, variance, skewness, and kurosis, exemplary embodiments may utilize the features of entropy, energy, contrast, and homogeneity, as these features may be especially able to capture the spatial dependence of intensity values within PE candidates. Accordingly, the features of entropy, energy, contrast, and homogeneity may be calculated for each co-occurrence matrix (Step S102).

The entropy feature measures the randomness of a gray-level distribution and is expected to be high if the gray levels of PE candidate voxels are distributed randomly within a PE candidate. Entropy may be calculated in accordance with the following equation:

$$\text{Entropy} = -\sum_i^N \sum_j^N C_d(i,j) \log C_d(i,j) \qquad (7)$$

The energy feature measures the number of repeated pairs of voxel gray levels and is expected to be high where co-occurrence concentrates within pairs (i,j). Energy may be calculated in accordance with the following equation:

$$\text{Energy} = -\sum_i^N \sum_j^N C_d^2(i,j) \qquad (8)$$

The contrast feature measures the amount of local variations within a given PE candidate. The contrast is expected to be low when the gray levels of each voxel pair are similar. Contrast may be calculated in accordance with the following equation:

$$\text{Contrast} = -\sum_i^N \sum_j^N (i,j)^2 C_d(i,j) \qquad (9)$$

The homogeneity feature measures the smoothness of a PE candidate. The homogeneity is expected to be large where the gray levels of each pixel pair are similar. Homogeneity may be calculated in accordance with the following equation:

$$\text{Homogeneity} = -\sum_i^N \sum_j^N \frac{C_d(i,j)}{1+|i-j|} \qquad (10)$$

Based on the above definitions, it may be expected that a true PE would have a low entropy, high energy, low contrast and large homogeneity. A PE candidate that actually represents noise or poorly mixed contrast, and as such is a false positive, might have different values for one or more of entropy, energy, contrast and homogeneity. Accordingly, each PE candidate may then be classified as either a true PE or false positive based on the calculated values for one or more of entropy, energy, contrast and homogeneity (Step S103). If the PE candidate is determined to be a true PE (Yes, Step S103), then consideration may continue. If, however, the PE candidate is determined to be a false positive No, Step S103), then the PE candidate may be rejected (Step S110). It should be understood that in this context, a determination that a PE candidate may be a true PE does not conclusively establish that the PE will be presented as a true PE to the user, it may mealy indicate that the PE candidate has not been ruled out. A PE candidate may only be presented as a true PE to the user if it is found to be a true PE for every test that is applied.

Classification may be performed, for example, based on a classification algorithm, for example, as described in J. Bi and J. Liang, "Multiple instance learning of pulmonary embolism detection with geodesic distance along vascular structure," *Proceedings of IEEE Computer Society Conference on Computer Vision and Pattern Recognition (CVPR '07)*, Minneapolis, Minn., 2007, which is incorporated by reference herein.

However, other approaches for classification may be performed. For example, a threshold may be used for determining if entropy is low enough, energy is high enough, contrast is low enough and homogeneity is large enough, wherein a failure to satisfy one or more features may be used to determine that the PE candidate is a false positive. Alternatively, an error value may be calculated for the difference between each calculated feature and an expected true PE value, and the error values may be combined to determine if the total error exceeds a predetermined threshold. Other techniques may be used in addition or as an alternative to the techniques discussed herein.

Other means may be employed to rule out potential false positives. These steps may be performed either before or after classification based on the four determined factors in Step S103. However, herein, other means for removing false positives are described as occurring afterwards, even though this choice may easily be reversed while remaining within the scope of the present invention. Accordingly, if it is determined that the PE candidate is a false positive in Step S103, then the PE candidate is withdrawn from consideration. If, however, it is determined that the PE candidate is a true PE, additional steps may be performed to verify this determination. For example, exemplary embodiments of the present invention may verify that the PE candidate is indeed within a vessel (Step S104) as a true PE may only be within a vessel. This step may be used, for example, to eliminate false positives that are based on connective (lymph) tissue that is located outside of the arteries. If the PE candidate is found to be within a vessel (Yes, Step S104) then the PE candidate may be a true PE. If, however, the PE candidate is found to not be in a vessel (No, Step S104), then it may be rejected as a false positive (S110).

In making this determination, a set of features may be used to determine if the PE candidate is within the arteries. These features may be based, for example, on the multi-scale Hessian vessel-likelihoods. Ideally, if a voxel is located within a vessel, the Hessian matrix H formed from second derivatives of intensity within neighborhood of the voxel will have two negative eigenvalues and a third eigenvalue is close to zero. The eigenvectors corresponding to the first two eigenvalues lie in a plane that is orthogonal to the central axis of the vessel and the eigenvector corresponding to the third eigenvalue is in line with the central axis. Based on the eigenvalues, vessel-likelihoods can be computed based on methods such as those described in A. F. Frangi, W. J. Niessen, K. L. Vincken, and M. A. Viergever, "Multiscale vessel enhancement filterng," *Medical Image Computing and Computer-Assisted Intervention, pp.* 130-137, 1998; Y. Santo, S. Nakajima, H. Atsumi, T. Koller, G. Gerig, S. Yoshida, and R. Kikinis, "3d multiscale line filter for segmentation and visualization of curvilinear structures in medical images," *CVRMed-MRCAS'97: Proceedings of the First Joint Conference on Computer Vision, Virtual Reality and Robotics in Medicine and Medical Robotics and Computer-Assisted Surgery*. London, UK, Springer-Verlag, pp. 213-222, 1997; and C. Lorenz, 1. C. Carlsen, T. M. Buzug, C. Fassnacht, and J. Weese, "Multi-scale line segmentation with automatic estimation of width, contrast and tangential direction in 2d and 3d medical images," *CVRMed-MRCAS'97: Proceedings of the First Joint Conference on Computer Vision, Virtual Reality and Robotics in Medicine and Medical Robotics and Computer-Assisted Surgery*. London, UK, Springer-Verlag, pp. 233-342, 1997, each of which is herein incorporated by reference.

However, vessel likeliness may only be computed for vessels that do not have PEs, so in order to perform this step on the vicinity of a PE candidate, the candidate may first be filled in with a set of high-intensity values to simulate the appearance of an artery with PEs. To accommodate the different vessel radii, three vessel-likelihoods are computed at five different scales and the maximal response for each vessel-likelihood is taken across the five scales.

For example, the Hessian-based vesselness features may be computed as follows:
1. Fill the detected candidates with high-intensity values.
2. Compute vessel-likelihood features for each voxel x in the candidate by:
   a. Constructing the Hessian matrix H(x, s) based on the second derivatives in scale s at voxel x.
   b. Decomposing H into eigenvalues $\lambda_1$, $\lambda_2$, and $\lambda_3$ with $|\lambda_1| \leq |\lambda_2| \leq |\lambda_3|$ in scale s.
   c. Computing three vessel-likelihoods in scale s at voxel x:

$$F(x, s) = \left[1 - e^{-\frac{1}{2}\left(\frac{\lambda_2}{\alpha \lambda_3}\right)^2}\right] e^{-\frac{1}{2|\lambda_2 \lambda_3|}\left(\frac{\lambda_1}{\beta}\right)^2} \left[1 - e^{-\frac{\lambda_1^2 \lambda_2^2 \lambda_3^2}{2\gamma^2}}\right] \quad (11)$$

$$S(x, s) = \left\{\sigma^2 |\lambda_3| \left(\frac{\lambda_2}{\lambda_3}\right)^\xi \left(1 + \frac{\lambda_1}{|\lambda_2|}\right)^\tau, \lambda_3 \leq \lambda_2 \leq \lambda_1 \leq 0 \right. \quad (12)$$

$$L(x, s) = \sigma^\eta \left|\frac{\lambda_2 + \lambda_3}{2}\right| \quad (13)$$

d. Maximizing vessel-likelihoods at voxel x across scale s:

$$F(x) = \max_s F(x, s), \quad (14)$$
$$S(x) = \max_s S(x, s),$$
$$L(x) = \max_s L(x, s)$$

3. Compute statistical features such as maximum, minimum, mean, median, and standard deviation based on the computed three vessel-likelihoods for all the voxels of the PE candidate.

True PE candidates may have much higher vessel-likelihoods in magnitude than those PE candidates that occur outside of vessels such as lymph tissue false positives. Accordingly, vessel-likelihood, for example, as described above, may be used to verify that each PE candidate is indeed within a vessel and thus is a true PE rather than a false positive.

As true PEs may only exist in arteries, PE candidates appearing in veins may be rejected as false positives. Exemplary embodiments of the present invention may also reduce false positives by differentiating between PE candidates that appear in veins and PE candidates that appear in arteries (Step S105) so that those PE candidates that appear in veins (No, Step S105) may be removed from consideration as false positives (Step S110) and those PE candidates that are determined to appear in arteries (Yes, Step S105) may be presented to a user as a true PE (Step S106). This may be accomplished, for example, by extracting a vessel segment from the given PE candidate and then computing a set of features to capture the intensity and texture patterns of the vessel segment and utilizing the feature results to determine whether the vessel segment more closely matches a vein or an artery. In this way, vessel segmentation may be limited to a relevant area around the PE candidate and the complete vessel tree need not be segmented.

The vessel segment may be extracted from the PE candidate region, for example, by first extracting the PE candidate boundary surface. The boundary surface may be extracted by checking the neighbors of each voxel of the PE candidate. The neighbors that are determined not to belong to the PE candidate may be considered part of the boundary surface. A graph-searching based iterative region-growing process may be performed using the voxels determined to be part of the boundary surface as an initial seed. The region-growing process may then segment additional surface area to form a minimum cumulative cost path map. The cost-map, so formed, may be set to the Euclidian distance from the boundary of the candidate component. The region-growth may thus occur from the voxel with the lowest cumulative distance costs on the boundary of the growing region. In the growing process, only those voxels with an intensity value that meets a predetermined threshold (e.g. 100 HU) may be considered so that the growth occurs along the contrast enhanced vessels. As a result, the extracted region may grow in layers, for example, layers that are equal in distance to the boundary of the PE candidate. The layers may stop when the vessel length is larger than a predetermined value, for example, 30 mm. Accordingly, segmentation may be achieved of the vessel surface for a desired length.

Once the vessel segment has been extracted, basic intensity distribution features such as, for example, mean, variance, skewnes, and kurtosis may be calculated for the vessel segment. Gray level co-occurrence matrices may be calculated from the vessel segment in a manner similar to that discussed above with respect to the verification of the PE candidates. Then, wavelet-based texture features may be calculated based from the co-occurrence matrices. In the case of the volumetric images, the discrete wavelet composition may be obtained by applying wavelet filters, for example, a lowpass filter h and a highpass filter g, along the x, y, and z directions of the volumetric image. In a one-level decomposition of the three-dimensional wavelet transform (DWT), the particular pair of filters h and g may correspond to the particular type of wavelet used. A multi-level DWT decomposition may be obtained by repeating the DWT procedure until the desired level is reached. According to one exemplary embodiment of the present invention, Daubechies 8-tap filters and two-level decomposition of 3D DWT may be used to compute the wavelet subvolumes. Then, for each subvolume, the energy feature may be calculated from the wavelet coefficients, $$W = \frac{1}{N_x N_y N_z} \sum_x \sum_y \sum_z |w(x, y, z)| \quad (6)$$

where Nx, Ny, and Nz are dimensions of the subvolume and w( . . . ) is a wavelet coefficient within the subvolume. For each candidate, there may be nine energy features computed from the nine subvolumes.

The third set of features may be validated by incrementally including them into a training process and hence, the final set of features may include co-occurrence based features. Accordingly, PE candidates may be detected and false positives may be efficiently and effectively removed from the candidate pool. This may be accomplished quickly and with minimal computational resources by avoiding the step of complete segmentation of the vessel tree.

It is to be understood that exemplary embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 11:
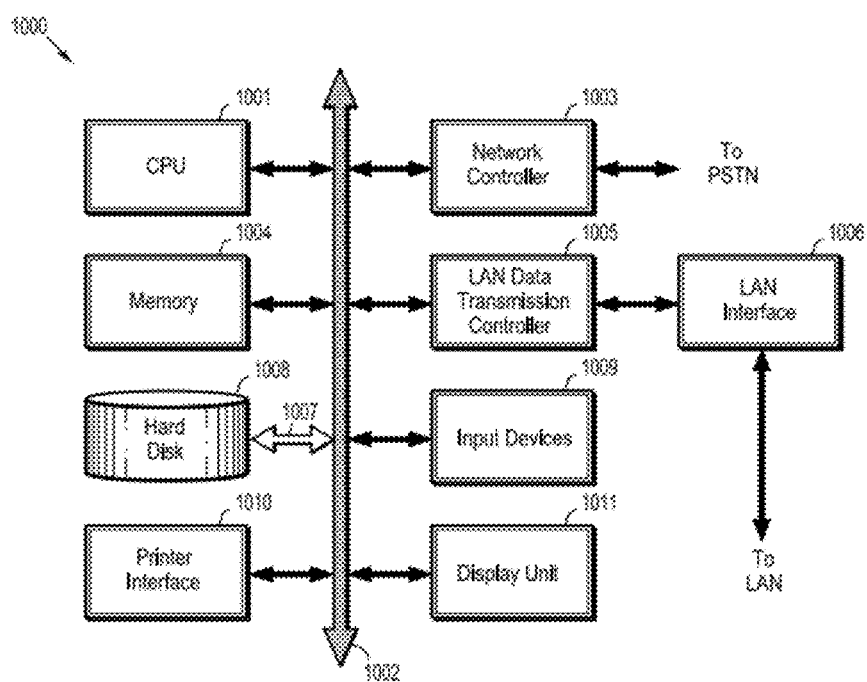
FIG. 11 shows an example of a computer system capable of implementing the method and apparatus according to embodiments of the present disclosure.

FIG. 11 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for computer aided detection of pulmonary emboli, comprising:
    acquiring medical image data;
    identifying a pulmonary embolism candidate comprising a cluster of voxels;
    determining whether the candidate is a true pulmonary embolism or a false positive based on a spatial distribution of intensity values for the voxels of the cluster of voxels; and
    present the pulmonary embolism candidate to a user when the candidate is determined to be a true pulmonary embolism, wherein determining whether the candidate is a true pulmonary embolism or a false positive based on the spatial distribution of intensity values for each voxel of the cluster of voxels includes:
    representing the cluster of voxels as a gray level co-occurrence matrix;
    calculating one or more features from the co-occurrence matrix; and
    determining whether the candidate is a true pulmonary embolism based on the calculated values of the one or more features.

2. The method of claim 1, wherein the one or more features comprise one or more of entropy, energy, contrast and homogeneity.

3. The method of claim 2, wherein the candidate is determined to be a true pulmonary embolism candidate when the entropy is low, the energy is high, the contrast is low and the homogeneity is large.

4. The method of claim 3, wherein trained classifiers are used to determine when entropy is low, energy is high, contrast is low and homogeneity is large.

5. The method of claim 1, wherein determining whether the candidate is a true pulmonary embolism or a false positive is based on whether the candidate is surrounded by a vessel-like surface, in addition to the spatial distribution of intensity values for the voxels of the cluster of voxels.

6. The method of claim 5, wherein determining whether the candidate is surrounded by a vessel-like surface includes performing a multi-scale Hessian vessel likelihood test.

7. The method of claim 6, wherein it is determined that the candidate is surrounded by a vessel-like surface when a Hessian matrix H formed from second derivatives of intensity within a neighborhood of the voxels proximate to the candidate have two negative eigenvalues and a third eigenvalue that is close to zero and eigenvectors corresponding to the first two eigenvalues lie in a plane that is orthogonal to a central axis and an eigenvector corresponding to the third eigenvalue is in line with the central axis.

8. The method of claim 1, wherein determining whether the candidate is a true pulmonary embolism or a false positive is based on whether the candidate is located within an artery, in addition to the spatial distribution of intensity values for the voxels of the cluster of voxels.

9. The method of claim 8, wherein determining whether the candidate is located within an artery includes:
    segmenting a segment of a surrounding vessel;
    calculating a gray level co-occurrence matrix for the vessel segment;
    calculating texture features for the vessel segment based on the gray level co-occurrence matrix; and
    determining whether the calculated texture features are indicative of an artery.

10. A method for computer aided detection of pulmonary emboli, comprising:
    acquiring a CT scan of a patient subject;
    identifying one or more pulmonary embolism candidates from within the CT scan using a concentration-oriented tobogganing approach;
    representing each of the pulmonary embolism candidates as a gray level co-occurrence matrix;
    calculating one or more features from each co-occurrence matrix, the one or more features including entropy, energy, contrast and homogeneity; and
    determining whether each of the identified pulmonary embolism candidates is a true pulmonary embolism or a false positive based on the calculated features from each co-occurrence matrix.

11. The method of claim 10, wherein a candidate of the one or more pulmonary embolism candidates is determined to be a true pulmonary embolism candidate when the entropy is low, the energy is high, the contrast is low and the homogeneity is large.

12. The method of claim 11, wherein trained classifiers are used to determine when entropy is low, energy is high, contrast is low and homogeneity is large.

13. The method of claim 10, wherein determining whether each of the identified pulmonary embolism candidates is a true pulmonary embolism or a false positive additionally includes determining whether the candidate is surrounded by a vessel-like surface.

14. The method of claim 10, wherein determining whether each of the identified pulmonary embolism candidates is a true pulmonary embolism or a false positive additionally includes determining whether the candidate is located within an artery.

15. The method of claim 14, wherein determining whether each of the identified pulmonary embolism candidates is located within an artery includes:
    segmenting a segment of a surrounding vessel;
    calculating a gray level co-occurrence matrix for the vessel segment;

calculating texture features for the vessel segment based on the gray level co-occurrence matrix; and determining whether the calculated texture features are indicative of an artery.

16. A computer system comprising:

a processor; and a program storage device readable by the computer system, embodying a program of instructions executable by the processor to perform method steps for detection of pulmonary emboli, the method comprising:

acquiring medical image data;

identifying a pulmonary embolism candidate within the medical image data;

representing the identified pulmonary embolism candidate as a gray level co-occurrence matrix;

calculating one or more features from the co-occurrence matrix, the one or more features including one or more of entropy, energy, contrast and homogeneity; and determining whether the identified pulmonary embolism candidates is a true pulmonary embolism or a false positive based on the calculated features.

17. The computer system of claim 16, wherein the candidate is determined to be a true pulmonary embolism candidate when the entropy is low, the energy is high, the contrast is low and the homogeneity is large.

18. The computer system of claim 17, wherein trained classifiers are used to determine when entropy is low, energy is high, contrast is low and homogeneity is large.

19. The computer system of claim 16, wherein determining whether the identified pulmonary embolism candidates is a true pulmonary embolism or a false positive additionally includes determining whether the candidate is located within an artery.

* * * * *